US011142253B2

United States Patent
Yamazaki et al.

(10) Patent No.: US 11,142,253 B2
(45) Date of Patent: Oct. 12, 2021

(54) VEHICLE SIDE BODY STRUCTURE

(71) Applicant: Mazda Motor Corporation, Hiroshima (JP)

(72) Inventors: Tadashi Yamazaki, Hiroshima (JP); Takeshi Nakamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/815,246

(22) Filed: Mar. 11, 2020

(65) Prior Publication Data
US 2020/0398898 A1    Dec. 24, 2020

(30) Foreign Application Priority Data

Jun. 18, 2019  (JP) .............................. JP2019-112696

(51) Int. Cl.
| B62D 25/02 | (2006.01) |
| B62D 25/04 | (2006.01) |
| B62D 21/15 | (2006.01) |

(52) U.S. Cl.
CPC ........... B62D 25/025 (2013.01); B62D 25/04 (2013.01); B62D 21/157 (2013.01)

(58) Field of Classification Search
CPC ...... B62D 25/02; B62D 25/04; B62D 25/025; B62D 21/157; B62D 27/02; B62D 27/023
USPC .............................. 296/209, 193.06, 187.12
See application file for complete search history.

(56) References Cited

U.S. PATENT DOCUMENTS

| 8,651,562 B2 * | 2/2014 | Zornack ............... B62D 21/157 296/193.06 |
| 9,580,111 B1 * | 2/2017 | Caliskan ............... B62D 29/005 |
| 2010/0194146 A1 | 8/2010 | Nishimura et al. |
| 2016/0194034 A1 * | 7/2016 | Emura ................... B62D 25/04 296/209 |

(Continued)

FOREIGN PATENT DOCUMENTS

| JP | 2000085634 A | 3/2000 |
| JP | 2010173562 A | 8/2010 |

(Continued)

OTHER PUBLICATIONS

European Patent Office, Extended European Search Report Issued in Application No. 20162593.6, dated Sep. 22, 2020, Germany, 7 pages.

*Primary Examiner* — Dennis H Pedder

(74) *Attorney, Agent, or Firm* — Alleman Hall Creasman & Tuttle LLP

(57) ABSTRACT

To suppress such twisting of a side sill that an upper portion thereof is displaced inwardly with respect to a lower portion thereof during a lateral collision while suppressing a weight increase of the side sill, a vehicle side body structures includes: a side sill that has a closed cross-sectional space extending in a vehicle longitudinal direction; and a center pillar extending upward from the side sill. The center pillar is configured such that an upper direct upward portion located above a direct upward portion, which continues from the side sill and is located immediately above the side sill has a higher rigidity against an inward load than the direct upward portion. In the closed cross-sectional space, sections are provided in a front and/or rear portion of a center pillar arrangement region, in which the center pillar is located, in a longitudinal direction.

8 Claims, 4 Drawing Sheets

(56) References Cited

U.S. PATENT DOCUMENTS

| | | | |
|---|---|---|---|
| 2016/0236719 A1* | 8/2016 | Tanaka | B62D 21/157 |
| 2017/0297628 A1 | 10/2017 | Iyoshi et al. | |
| 2017/0305469 A1* | 10/2017 | Iyoshi | B62D 27/023 |
| 2019/0009834 A1* | 1/2019 | Kageyama | B62D 25/04 |

FOREIGN PATENT DOCUMENTS

| | | | |
|---|---|---|---|
| JP | 6197841 B2 | | 9/2017 |
| WO | WO2011/030463 | * | 3/2011 |
| WO | WO2014/199755 | * | 12/2014 |

* cited by examiner

VEHICLE SIDE BODY STRUCTURE

TECHNICAL FIELD

The present invention relates to a vehicle side body structure including: a side sill that has a closed cross-sectional structure extending in a vehicle longitudinal direction; and a center pillar that has a closed cross-sectional structure extending upward from the side sill, and being formed with an opening at a position above the side sill and on each of front and rear sides of the center pillar.

BACKGROUND ART

Conventionally, various structures have been developed to suppress deformation of a center pillar for a purpose of securing safety of an occupant during a lateral collision of a vehicle (hereinafter referred to as a "lateral collision") and the like. For example, Patent Document 1 focuses on a difference in an amount of entry of the center pillar toward an inner side in a vehicle width direction caused by a vertical position, at which the center pillar is bent, in the center pillar during the lateral collision.

More specifically, FIG. 13 in Patent Document 1 discloses a deformation mode in which an intermediate portion of the center pillar in a vertical direction is bent. In this case, the intermediate portion is significantly projected toward the inner side in the vehicle width direction.

In order to handle the above problem, it is described in Patent document 1 that the center pillar is shaped such that a lower portion thereof is relatively easily crushed in comparison with an upper portion and the intermediate portion in the vertical direction. As illustrated in FIG. 12 of Patent Document 1, the center pillar is thereby brought into the deformation mode in which the lower portion of the center pillar is relatively significantly deformed during the lateral collision of the vehicle so as to prevent bending (the deformation mode as illustrated in FIG. 13) of the intermediate portion of the center pillar in the vertical direction, and, as a result, it is possible to reduce a maximum deformation amount of the center pillar toward the inner side in the vehicle width direction.

Here, the inventors of the present application focused on, in the deformation mode in which the lower portion of the center pillar was relatively significantly deformed during the lateral collision, as illustrated in FIG. 12 of Patent Document 1, twisting of a side sill was suppressed by a load transmitted from the center pillar to the side sill, which could reduce a falling amount of the lower portion of the center pillar toward the inner side in the vehicle width direction, as a result, lead to a reduction in the amount of entry of the center pillar to the inner side in the vehicle width direction, and also contributed to suppression of misshaping of a cross-section occurring in the side sill.

Meanwhile, with increased needs for a light vehicle body weight for purposes of improving fuel economy and improving travel performance in recent years, it is preferred to reduce the vehicle body weight while securing the safety of the occupant against the lateral collision. Thus, it is not preferred to form the entire side sill robustly for a purpose of increasing rigidity of the side sill against twisting thereof because the weight of the side sill cannot be reduced.

PRIOR ART DOCUMENTS

Patent Documents

Patent Document 1: JP 2010-173562A

SUMMARY OF THE INVENTION

Problem to be Solved by the Invention

The present invention has been made in view of such a problem and therefore has a purpose of providing a vehicle side body structure capable of suppressing such twisting that an upper portion of a side sill is displaced toward an inner side in a vehicle width direction with respect to a lower portion thereof during a lateral collision while suppressing a weight increase of the side sill.

Means for Solving the Problem

The present invention is a vehicle side body structure comprising: a side sill that has a closed cross-sectional structure extending in a vehicle longitudinal direction; and a center pillar that has a closed cross-sectional structure extending upward from the side sill, and being formed with an opening at a position above the side sill and on each of front and rear sides of the center pillar. The center pillar is configured such that an upper direct upward portion located above a direct upward portion, which continues from the side sill and is located immediately above the side sill in a vertical direction of the center pillar, has a higher rigidity against a load toward an inner side in a vehicle width direction than the direct upward portion. On the inside of a closed cross-section of the side sill, a section is provided in a front portion and/or a rear portion of a center pillar arrangement region, in which the center pillar is located, in a longitudinal direction.

With the above configuration, since the center pillar is configured such that the upper direct upward portion has the higher rigidity than the direct upward portion, a lower portion of the center pillar can actively be crushed during a lateral collision. In such a configuration promoting bending of the lower portion of the center pillar, as described above, the section is provided in the front portion and/or the rear portion of the center pillar arrangement region on the inside of the closed cross-section of the side sill. As a result, for example, compared to a case where the entire center pillar arrangement region is reinforced in the vehicle longitudinal direction, it is possible to suppress such twisting that an upper portion of the side sill is displaced toward an inner side in the vehicle width direction with respect to a lower portion thereof during the lateral collision while suppressing a weight increase of the side sill.

As an aspect of the present invention, in the center pillar arrangement region, a root region in the center pillar, which is joined to the side sill, includes an extending portion extending toward the inside of the closed cross-section, in the center pillar arrangement region, the root region of the center pillar is joined on an outer side of the extending portion in the vehicle width direction, and the section is provided on the outer side of the extending portion in the vehicle width direction and is joined to an inner surface, which faces the inside of the closed cross-section, in the side sill and the extending portion.

With the above configuration, in the case where such a twisting force that displaces the upper portion of the side sill toward the inner side in the vehicle width direction with respect to the lower portion thereof in a cross-sectional view that is perpendicular to the longitudinal direction is exerted from the outer side of the extending portion in the vehicle width direction in the center pillar arrangement region during the lateral collision, the extending portion can receive the twisting force via the section. Therefore, it is possible to suppress misshaping of the cross-section of the side sill caused by the load transmitted from the center pillar to the side sill during the lateral collision.

As an aspect of the present invention, the section is a first section, a second section is provided in front of and/or behind the center pillar arrangement region in the longitudinal direction of the inside of the closed cross-section, and the second section is provided to have a higher rigidity against misshaping of the cross-section in the cross-sectional view that is perpendicular to the longitudinal direction of the inside of the closed cross-section than the first section.

With the above configuration, the first section is provided in the front portion and/or the rear portion of the center pillar arrangement region in the longitudinal direction of the inside of the closed cross-section, and the second section is provided in front of and/or behind the center pillar arrangement region. As a result, in cooperation with these first section and second section, it is possible to receive the twisting force, which is applied to the side sill during the lateral collision, in a wide area along the longitudinal direction of the side sill.

Furthermore, the second section, which has the higher rigidity against misshaping of the cross-section of the side sill than the first section, is provided in front of and/or behind the center pillar arrangement region in the longitudinal direction of the inside of the closed cross-section. Therefore, it is possible to effectively suppress misshaping of the cross-section of the side sill, which is caused by the twisting force applied to the side sill, from these front position and rear position.

As an aspect of the present invention, a wall portion on the outer side in the vehicle width direction of the side sill has a bead, which is dented toward the inside of the closed cross-section, at a position near a center in the vertical direction, and at least one of the sections is joined to the bead from the inside of the closed cross-section.

With the above configuration, since the section is joined to the highly rigid bead in the wall portion on the outer side in the vehicle width direction of the side sill in the vertical direction, the wall portion on the outer side in the vehicle width direction of the side sill can further strongly be pressed against the section during the lateral collision. Therefore, it is possible to effectively suppress misshaping of the cross-section of the side sill against the twisting force.

As an aspect of the present invention, the section has a section body portion that partitions the inside of the closed cross-section in the vehicle longitudinal direction, and a part of the section body portion of the section communicates in the vehicle longitudinal direction.

With the above configuration, since the part of the section body portion of at least one of the first section and the second section communicates in the vehicle longitudinal direction, a corrosion inhibitor or the like can easily be sprayed on the inner surface of the side sill from one side to another side of the section in the longitudinal direction of the inside of the closed cross-section through the communicating portion. Therefore, it is possible to improve accuracy and work efficiency of spraying of the corrosion inhibitor or the like on the inner surface of the side sill.

Advantage of the Invention

According to the present invention, it is possible to suppress such twisting that the upper portion of the side sill is displaced toward the inner side in the vehicle width direction with respect to the lower portion thereof during the lateral collision while suppressing the weight increase of the side sill.

MODES FOR CARRYING OUT THE INVENTION

Figure 1:
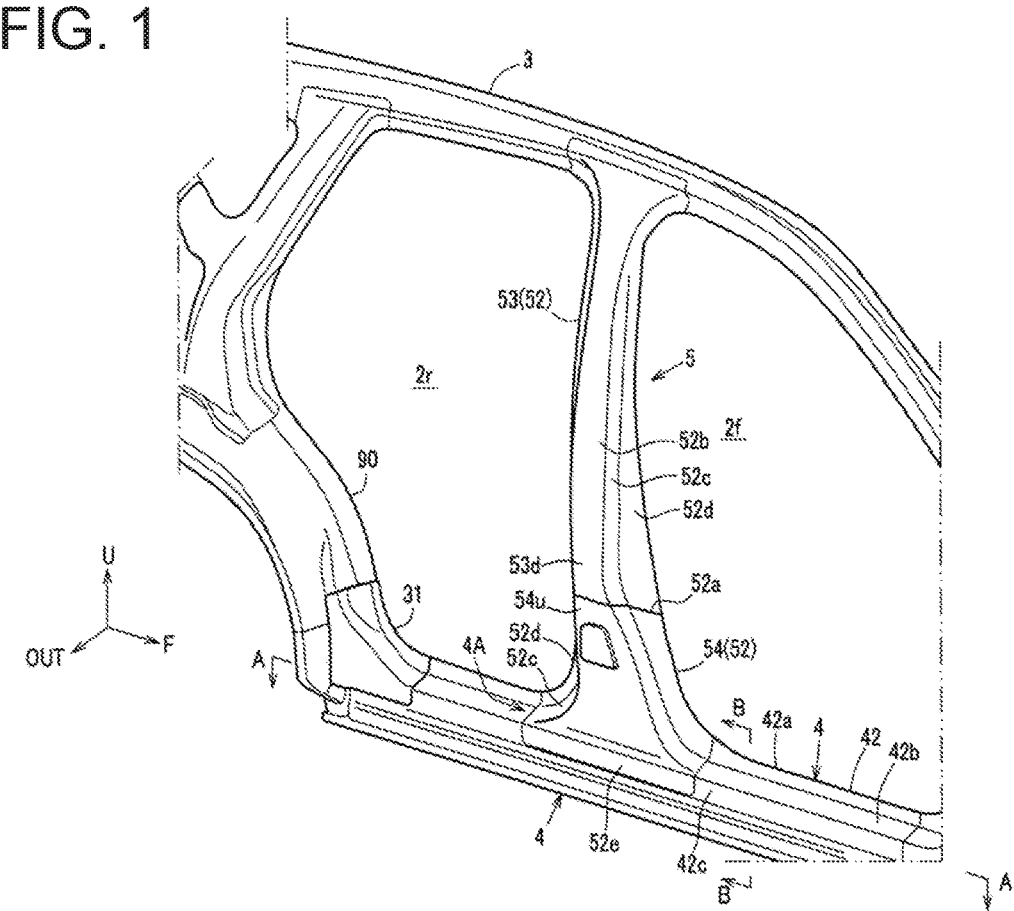
FIG. 1 is a perspective view in which a main section of a vehicle having a vehicle side body structure in this embodiment is seen from a right side of a vehicle body.

A detailed description will hereinafter be made on an embodiment of the present invention with reference to the drawings. In the drawings, an arrow F, an arrow U, and an arrow OUT respectively indicate a vehicle front direction, a vehicle up direction, and an outer side in a vehicle width direction (a vehicle right direction). In addition, in the following description, an outer side in a vehicle width direction (a cabin outer side) will be referred to as a vehicle width outer side, and an inner side in the vehicle width direction (a cabin inner side) will be referred to as a vehicle width inner side. Note that a vehicle side body structure of this embodiment, which will be described below, is provided substantially and bilaterally symmetrical on left and right sides of a vehicle.

As illustrated in FIG. 1, side openings 2*f*, 2*r* are formed in a vehicle side body portion. A roof side rail 3 that extends in a longitudinal direction is provided along upper sides of the side openings 2*f*, 2*r*. A side sill 4 that extends in the longitudinal direction is provided along lower sides of the side openings 2*f*, 2*r*.

A center pillar 5 that extends in a vertical direction is provided at an intermediate position between the side openings 2*f*, 2*r* in a vehicle longitudinal direction. In the center pillar 5, an upper end is joined to an intermediate portion of the roof side rail 3, which extends in the vehicle longitudinal direction, and a lower end is joined to an intermediate portion of the side sill 4, which extends in the vehicle longitudinal direction.

In this way, the side openings 2*f*, 2*r* are partitioned into openings on vehicle front and rear sides by the center pillar 5 and are provided as entry and exit openings 2*f*, 2*r* (the front entry and exit opening 2*f* and the rear entry and exit opening 2*r*).

The vehicle side body portion includes side doors that respectively open/close the front and rear entry and exit openings 2*f*, 2*r*. In FIG. 1, the side doors are not illustrated.

Figure 5:
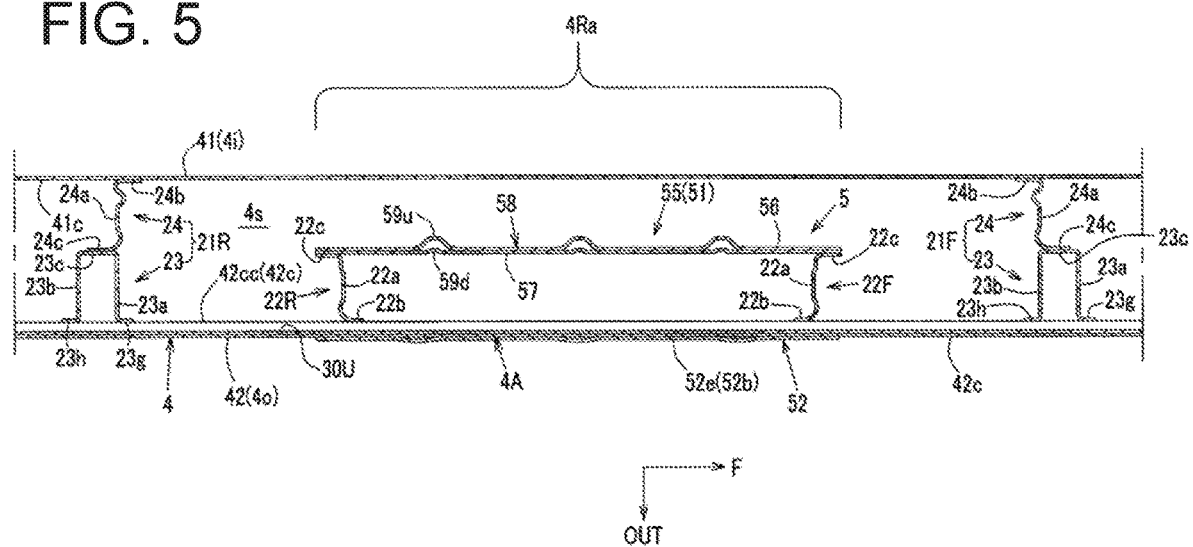
FIG. 5 is a cross-sectional view of the main section taken along line A-A in FIG. 1.
Figure 6A:
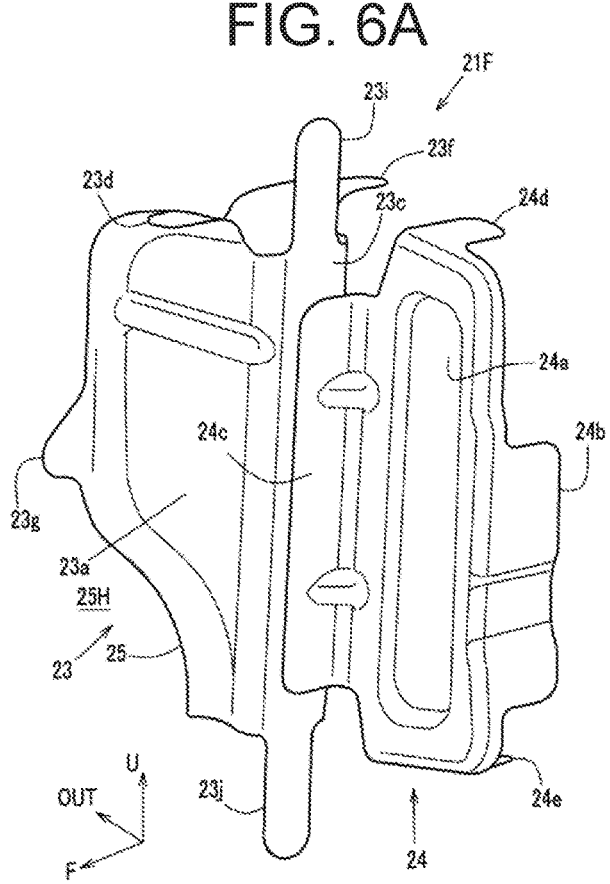
FIGS. 6A and 6B include perspective views in which a pillar forward section is seen from front and behind.
Figure 6B:
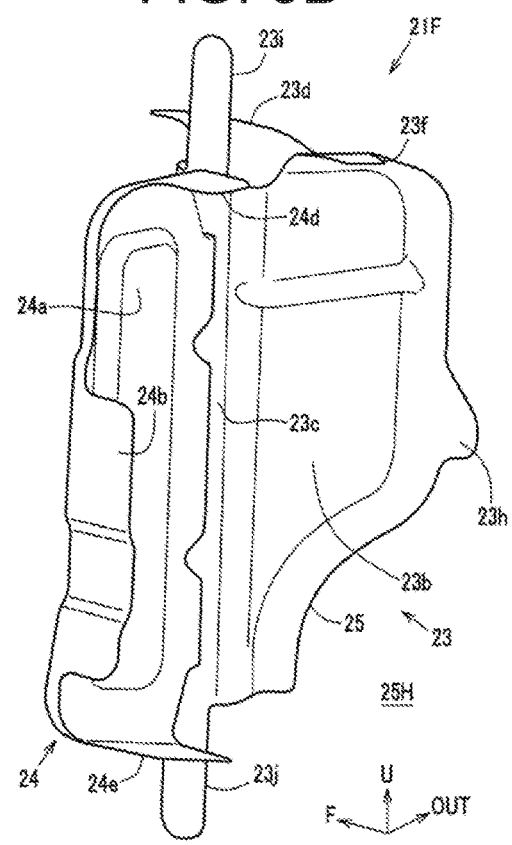
Figure 7:
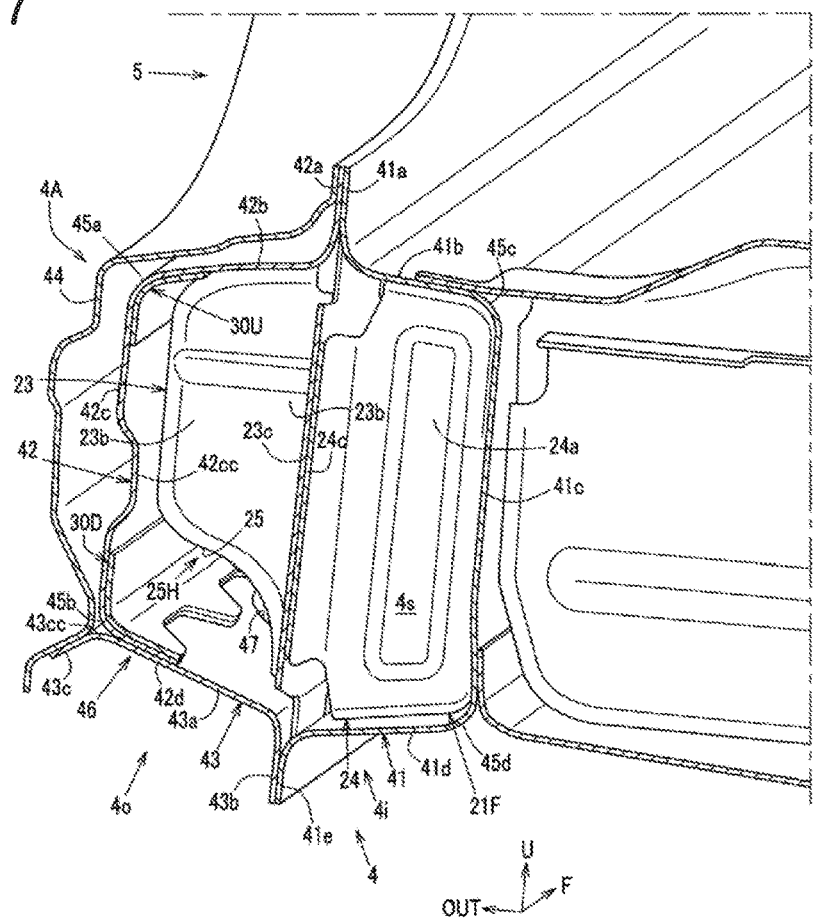
FIG. 7 is a perspective cross-sectional view of the main section of the vehicle side body structure corresponding to an arrow direction of B-B in FIG. 1.

As illustrated in FIG. 5 and FIG. 7, the side sill 4 is a vehicle body rigid member that has a closed cross-sectional space 4s extending in the vehicle longitudinal direction, and, as illustrated in FIG. 7, includes: a first member 41, a second member 42, and a third member 43 constituting the closed cross-sectional space 4s; and an exterior panel 44 (only illustrated in FIG. 7) attached to the vehicle width outermost side of the side sill 4.

As a side sill inner 4i formed in a hat shape whose perpendicular cross-section to the vehicle longitudinal direction is projected toward the vehicle width inner side, the first member 41 is provided on the vehicle width inner side of the side sill 4. More specifically, the first member 41 is integrally formed by including an upper end flange 41a extending in the vertical direction, an upper wall 41b extending toward the vehicle width inner side from a lower end of the upper end flange 41a, an inner wall 41c extending downward from a vehicle width inner end of the upper wall 41b, a lower wall 41d extending toward the vehicle width outer side from a lower end of the inner wall 41c, and a lower end flange 41e extending downward from a vehicle width outer end of the lower wall 41d.

As a side sill outer 4o formed in a hat shape whose perpendicular cross-section to the vehicle longitudinal direction is projected toward the vehicle width outer side, the second member 42 and the third member 43 are provided on the vehicle width outer side of the first member 41.

More specifically, the second member 42 is integrally formed by including an upper end flange 42a located in an upper portion and an intermediate portion in the vertical direction of the side sill outer 4o and extending in the vertical direction, an upper wall 42b extending toward the vehicle width outer side from a lower end of the upper end flange 42a, an outer wall 42c extending downward from an vehicle width outer end of the upper wall 42b, and a lower end flange 42d extending to the vehicle width inner side from a lower end of the outer wall 42c. The third member 43 is integrally formed by including a lower wall 43a located in a lower portion of the side sill outer 4o and extending toward the vehicle width inner side and a lower end flange 43b extending downward from a vehicle width inner end of the lower wall 43a.

The upper end flanges 41a, 42a of the first member 41 and the second member 42 as well as the lower end flanges 41e, 43b of the first member 41 and the third member 43 are integrally joined to each other by spot welding or the like. Furthermore, the lower end flange 42d of the second member 42 is joined to the lower wall 43a of the third member 43 from above (a side of the closed cross-sectional space 4s).

In this way, the side sill 4 constitutes the closed cross-sectional space 4s therein by the upper wall 41b, the inner wall 41c, and the lower wall 41d of the first member 41, the upper wall 42b and the outer wall 42c of the second member 42, and the lower wall 43a of the third member 43. In addition, in the side sill 4, ridgelines 45a, 45b, 45c, 45d extending in the vehicle longitudinal direction are respectively defined between the upper wall 42b and the outer wall 42c, the outer wall 42c and the lower end flange 42d, the upper wall 41b and the inner wall 41c, and the inner wall 41c and the lower wall 41d. Of these ridgelines 45a, 45b, 45c, 45d, the ridgeline 45a defined between the upper wall 42b and the outer wall 42c, that is, the ridgeline 45a defined at an upper end of the outer wall 42c is set as an upper outer ridgeline 45a, and the ridgeline 45b defined between the outer wall 42c and the lower end flange 42d, that is, the ridgeline 45b defined at the lower end of the outer wall 42c is set as a lower outer ridgeline 45b.

As illustrated in FIG. 7, the outer wall 42c of the side sill 4 is provided with an outer wall bead 42cc, which is dented toward the side of the closed cross-sectional space 4s, near a center in the vertical direction.

Figure 8:
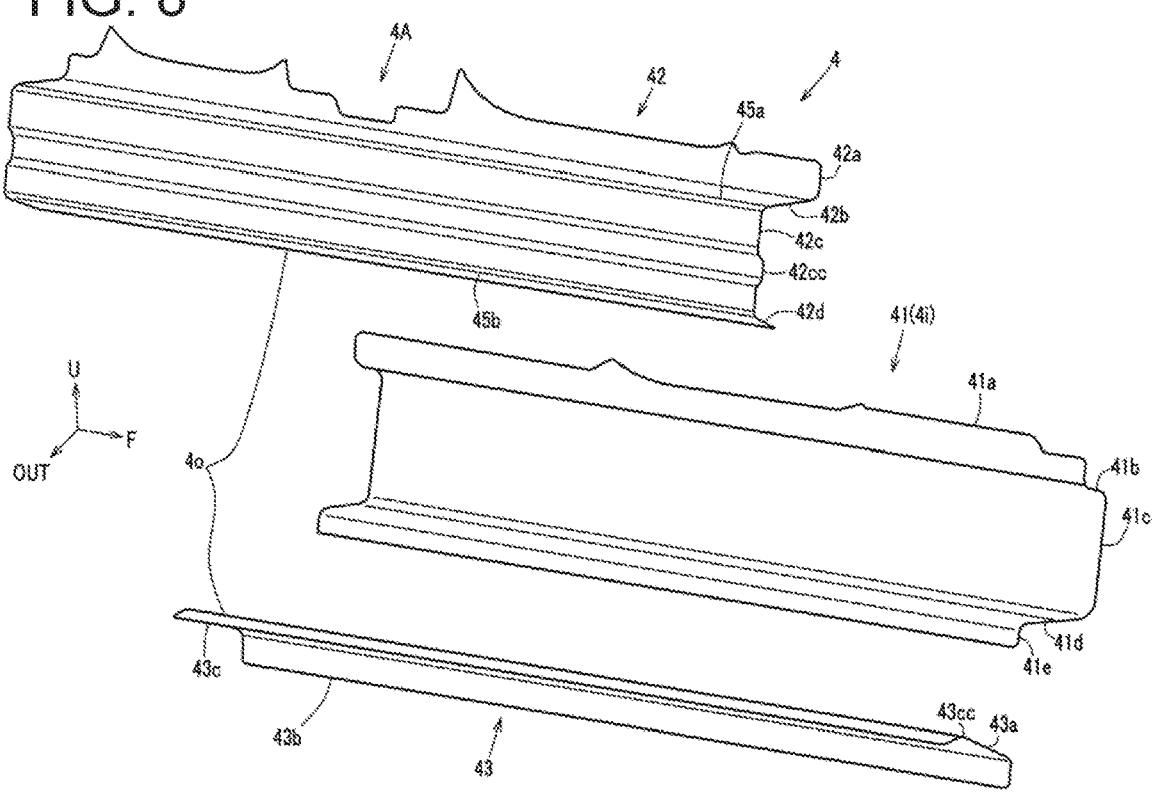
FIG. 8 is an exploded perspective view of a main section of the side sill.

As illustrated in FIG. 1, FIG. 7, and FIG. 8, the third member 43 is further formed with a vehicle width outer end flange 43c extending toward the vehicle width outer side from a vehicle width outer end of the lower wall 43a. This vehicle width outer end flange 43c extends toward the vehicle width outer side from an upper end portion of an overlapping portion 46 between the lower end flange 42d of the second member 42 and the lower wall 43a of the third member 43.

In a cross-sectional view that is perpendicular to the longitudinal direction of the side sill 4, the vehicle width outer end flange 43c is projected downward and to the vehicle width outer side from a position between the outer wall 42c and the lower wall 43a of the side sill 4 in a manner to be curved with respect to these outer wall 42c and lower wall 43a. In this way, a ridgeline 43cc extending in the vehicle longitudinal direction is defined in a base end portion of the vehicle width outer end flange 43c.

In the cross-sectional view that is perpendicular to the longitudinal direction of the side sill 4, this ridgeline 43cc matches or is located near the above-described lower outer ridgeline 45b. In the present example, the ridgeline 43cc located in the base end portion of the vehicle width outer end flange 43c is located under and near the lower outer ridgeline 45b.

Figure 3:
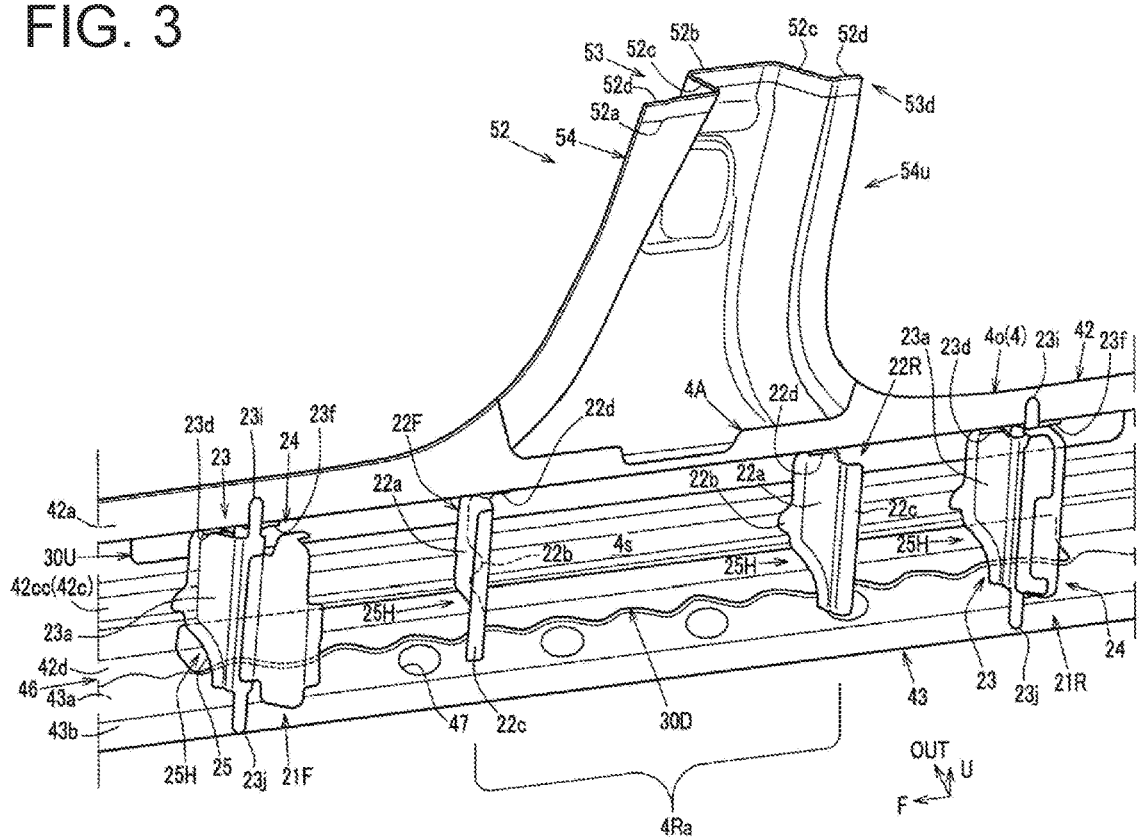
FIG. 3 is a perspective view in which a pillar inner is removed from FIG. 2.

Moreover, as illustrated in FIG. 3, the lower wall 43a of the third member 43 in the side sill 4 is formed with a plurality of through holes 47, each of which has a substantially circular shape in a plan view, along the vehicle longitudinal direction. Each of these through holes 47 is used to insert a corrosion inhibitor spray gun (not illustrated) in the closed cross-sectional space 4s in order to introduce an electrodeposition liquid or the like into the closed cross-sectional space 4s of the side sill 4 or spraying a corrosion inhibitor on an inner surface that faces the closed cross-sectional space 4s of the side sill 4.

As illustrated in FIG. 3, FIG. 5, and FIG. 7, the side sill 4 includes sections 21F, 21R, 22F, 22R, each of which partitions the closed cross-sectional space 4s in the vehicle longitudinal direction.

The sections 21F, 21R, 22F, 22R are provided along the vehicle longitudinal direction of the side sill 4. In the present example, the sections 21F, 21R, 22F, 22R are at least provided at four positions in a front portion and a rear portion of a center pillar arrangement region 4Ra and a portion in front of and a portion behind the center pillar arrangement region 4Ra in the longitudinal direction of the side sill 4.

These sections 21F, 21R, 22F, 22R are set as a pillar forward section 21F, a pillar front section 22F, a pillar rear section 22R, and a pillar rearward section 21R in an order from a front side to a rear side.

As illustrated in FIG. 3 and FIG. 5, a pair of the pillar forward section 21F and the pillar rearward section 21R and a pair of the pillar front section 22F and the pillar rear section 22R are each disposed in a substantially symmetrical shape about a center axis of the center pillar 5 extending in the vertical direction. Thus, a configuration of each of the sections 21F, 21R, 22F, 22R and joining thereof to the side sill 4 and the like will be described based on the pillar forward section 21F and the pillar front section 22F.

As illustrated in the same drawings, the pillar front section 22F is disposed on the vehicle width outer side of the closed cross-sectional space 4s of the side sill 4, that is, only on a side of the side sill outer 4o (the second member 42 and the third member 43) among the side sill outer 4o and the side sill inner 4i, and is integrally formed by including a vertical wall 22a that partitions the closed cross-sectional space 4s in the vehicle longitudinal direction, an outer end flange 22b extending rearward from a vehicle width outer end of the vertical wall 22a, an inner end flange 22c extending forward from a vehicle width inner end of the vertical wall 22a, and an upper end flange 22d (see FIG. 3) extending rearward from an upper end of the vertical wall 22a.

As illustrated in FIG. 3 and FIG. 5, in the pillar front section 22F, the outer end flange 22b is joined to the outer wall bead 42cc in the outer wall 42c of the second member 42 in the side sill 4, the upper end flange 22d (see FIG. 3) is joined to the upper wall 42b (see FIG. 7) of the second member 42 in the side sill 4, and the inner end flange 22c (see FIG. 5) is joined to a lower portion of a pillar inner 51 (that is, an extending portion 55 described later), which will be described later.

As illustrated in FIG. 3, FIG. 5, FIGS. 6A, 6B, and FIG. 7, the pillar forward section 21F is constructed of an outer section component 23 located on the vehicle width outer side and an inner section component 24 located on the vehicle width inner side.

The outer section component 23 is integrally formed to have a gate-shaped double-wall structure in the plan view by including a front wall 23a and a rear wall 23b separately disposed in the vehicle longitudinal direction and an inner wall 23c coupling vehicle width outer ends of these front wall 23a and rear wall 23b in the vehicle longitudinal direction. Furthermore, the front wall 23a is integrally formed with a front wall upper end flange 23d extending forward from an upper end thereof and a front wall outer end flange 23g extending forward from an outer end thereof in the vehicle width direction. The rear wall 23b is integrally formed with a rear wall upper end flange 23f extending rearward from an upper end thereof and a rear wall outer end flange 23h extending rearward from an outer end thereof in the vehicle width direction. Moreover, the inner wall 23c is integrally formed with an upper end flange 23i extending upward from an upper end thereof and a lower end flange 23j extending downward from a lower end thereof.

As illustrated in the same drawings, the inner section component 24 is integrally formed by including a vertical wall 24a extending in the vertical direction and the vehicle width direction, a vehicle width inner end flange 24b extending rearward from a vehicle width inner end of the vertical wall 24a, a vehicle width outer end flange 24c extending forward from a vehicle width outer end of the vertical wall 24a, an upper end flange 24d extending rearward from an upper end of the vertical wall 24a, and a lower end flange 24e extending rearward from a lower end of the vertical wall 24a.

In the pillar forward section 21F, the inner wall 23c of the outer section component 23 and the vehicle width outer end flange 24c of the inner section component 24 are integrally joined to each other by welding or the like.

Just as described, the pillar forward section 21F and the pillar rearward section 21R each includes the outer section component 23 formed in the double-wall structure in the plan view. Thus, each of the pillar forward section 21F and the pillar rearward section 21R is provided to have higher rigidity against misshaping of a cross-section of the side sill 4, which is associated with application of the load toward the vehicle width inner side to the center pillar 5, than the pillar front section 22F and the pillar rear section 22R.

As illustrated in FIG. 3, FIG. 5, and FIG. 7, in the pillar forward section 21F, the upper end flanges 23d, 23f of the outer section component 23 are joined to the upper wall 42b (see FIG. 7) of the second member 42 in the side sill 4, and the front wall outer end flange 23g and the rear wall outer end flange 23h of the outer section component 23 are joined to the outer wall bead 42cc in the outer wall 42c of the second member 42 in the side sill 4 (see FIG. 5). Furthermore, the upper end flange 24d (see FIG. 5) of the inner section component 24 is joined to the upper wall 41b (see FIG. 7) of the first member 41 in the side sill 4. The vehicle width inner end flange 24b (see FIG. 5) of the inner section component 24 and the lower end flange 24e (see FIGS. 6A, 6B) of the inner section component 24 are respectively joined to the inner wall 41c (see FIG. 7) and the lower wall 41d.

Figure 2:
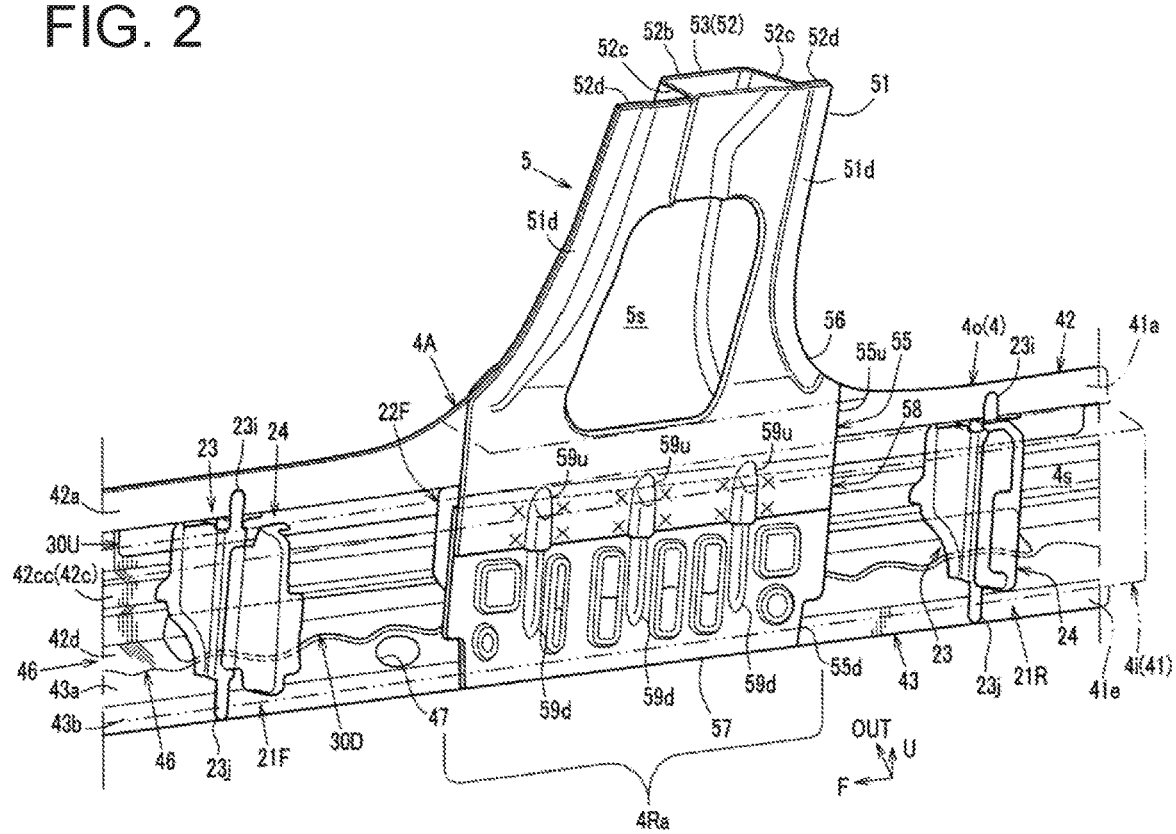
FIG. 2 is a perspective view in which a side sill inner is removed and a joined portion between a side sill and a center pillar and a portion therearound are seen from a vehicle width inner side.

As illustrated in FIG. 2, the upper end flange 23i in a tongue-piece shape provided in the outer section component 23 of the pillar forward section 21F is held between the upper end flanges 41a, 42a of the first member 41 and the second member 42 in the side sill 4 and is integrally joined to these upper end flanges 41a, 42a.

Similarly, the lower end flange 23j in a tongue-piece shape provided in the outer section component 23 of the pillar forward section 21F is held between the lower end flanges 41e, 43b of the first member 41 and the third member 43 in the side sill 4 and is integrally joined to these lower end flanges 41e, 43b.

As illustrated in FIG. 5, the pillar front section 22F and the pillar rear section 22R described above each partition the vehicle width outer side of the closed cross-sectional space 4s by the vertical wall 22a. The pillar forward section 21F and the pillar rearward section 21R each partition the vehicle width outer side of the closed cross-sectional space 4s by the front wall 23a and the rear wall 23b provided in the outer section component 23, and also partition the vehicle width inner side of the closed cross-sectional space 4s by the vertical wall 22a provided in the inner section component 24.

However, as illustrated in FIG. 3, FIGS. 6A, 6B, and FIG. 7, in the closed cross-sectional space 4s of the side sill 4, each of the sections 21F, 21R, 22F, 22R is formed with a clearance portion 25 in a shape to be recessed with respect to an opposing inner surface of the side sill 4 in the cross-sectional view that is perpendicular to the vehicle longitudinal direction.

In the present example, the clearance portion 25 is formed in the vertical wall 22a of each of the pillar front section 22F and the pillar rear section 22R, and is formed in the front wall 23a and the rear wall 23b of the outer section component 23 in each of the pillar forward section 21F and the pillar rearward section 21R. Each of the clearance portions 25 is formed in the recessed shape in the cross-sectional view that is perpendicular to the vehicle longitudinal direction so as to separate from a corner portion between the outer wall 42c of the second member 42 and the lower wall 43a of the third member 43 in the side sill 4.

In the closed cross-sectional space 4s, a communicating portion 25H (a space) that communicates between a space in front of each of the sections 21F, 21R, 22F, 22R and a space behind each thereof is formed between the clearance portion 25 formed in each of the sections 21F, 21R, 22F, 22R and the inner surface of the side sill 4 that the clearance portion 25 opposes.

In this way, the electrodeposition liquid can flow between the space on one side and the space on the other side of each of the sections 21F, 21R, 22F, 22R through the communicating portion 25H, and the unillustrated corrosion inhibitor spray gun, which is inserted in the closed cross-sectional space 4s from the through hole 47 provided in the lower wall 43a of the side sill 4, can spray the corrosion inhibitor from the space on the side where the spray gun is inserted to the space on the other side from specified one of the sections 21F, 21R, 22F, 22R through the communicating portion 25H.

As illustrated in FIG. 3, FIG. 5, and FIG. 7, the side sill outer 4o, which is constructed of the second member 42 and the third member 43, is provided with first reinforcing members 30U, 30D and a second reinforcing member 31, each of which reinforces bending rigidity against the load toward the vehicle width inner side.

The first reinforcing members 30U, 30D are the first upper reinforcing member 30U located in an upper portion of the side sill 4 and the first lower reinforcing member 30D located in a lower portion of the side sill 4.

The first upper reinforcing member 30U is joined to the side sill 4 at a height position of a center pillar joined portion 4A.

As illustrated in FIG. 3 and FIG. 7, the first lower reinforcing member 30D is joined to the side sill 4 at a position lower than the height position of the center pillar joined portion 4A.

As illustrated in FIG. 3, each of these first upper reinforcing member 30U and first lower reinforcing member 30D continuously extends in the vehicle longitudinal direction from a position in front of the center pillar 5 to a rear portion of the side sill 4 in a manner to cross the center pillar 5 along the longitudinal direction of the side sill 4.

As illustrated in FIG. 1, the above-described second reinforcing member 31 is provided in the rear portion of the side sill 4 and extends upward along a rear wheel house 90 from the rear portion of the side sill 4.

As illustrated in FIG. 1, FIG. 2, and FIG. 3, the above-described center pillar 5 includes the pillar inner 51 and a pillar outer 52 and is vertically provided from the side sill 4 by joining lower portions of these to the side sill 4. A lower portion of the center pillar 5 (a root region for the side sill 4) is formed such that a width thereof in the vehicle longitudinal direction is gradually increased downward from a portion near an upper end of the lower portion (that is, a boundary portion 52a described below (see FIG. 1 and FIG. 3)) to the upper end of the side sill 4.

As illustrated in FIG. 2, the pillar inner 51 is formed in a vertical wall shape (a substantially flat plate shape) in which the substantially entire portion in the vertical direction extends in the vehicle width direction, and is formed with a flange 51d on each of front and rear sides thereof.

As illustrated in FIG. 1 to FIG. 3, the pillar outer 52 is integrally formed by including an outer wall 52b extending in the vertical direction and the vehicle width direction, front and rear vertical walls 52c extending toward the vehicle width inner side from front and rear ends of the outer wall 52b, a flange 52d on each of the front and rear sides formed along the vertical wall 52c such that the substantially entire portion in the vertical direction has a hat-shaped cross-sectional shape opened toward the vehicle width inner side in the cross-sectional view that is perpendicular to the vertical direction.

The center pillar 5 is configured to have a closed cross-sectional space 5s extending in the vertical direction between the pillar inner 51 and the pillar outer 52 by joining the front edge flanges 51d, 52d and the rear edge flanges of the pillar inner 51 and the pillar outer 52.

As illustrated in FIG. 1, a lower portion of the pillar outer 52 is joined to the second member 42 of the side sill 4, and this joint structure will be described.

As illustrated in FIG. 1 and FIG. 5, the lower portion of the pillar outer 52 is formed with a lower end flange 52e extending downward from a lower end of the outer wall 52b, and this lower end flange 52e is joined to the outer wall 42c of the second member 42 in the side sill 4. In this way, as illustrated in FIG. 1, the outer wall 52b of the center pillar 5 and the outer wall 42c of the side sill 4 are arranged to be substantially flush in the vehicle width direction. In addition, as described above, the front and rear flanges 52d of the pillar outer 52 and the front and rear flanges 51d of the pillar inner 51 are integrally joined to each other, respectively. As illustrated in FIG. 2, lower portions of these flanges 51d, 52d on each of the front and rear sides are integrally joined to each other in a state of holding the upper end flange 42a of the second member 42 on a side of the side sill outer 4o from both of the inner and outer sides in the vehicle width direction. In this way, the front and rear flanges 51d, 52d of the center pillar 5 and the upper end flange 42a of the side sill 4 are arranged to be substantially flush in the vehicle width direction.

In this state, as illustrated in FIG. 1, the vertical wall 52c on each of the front and rear sides of the pillar outer 52 is brought into a state where a lower end thereof contacts the upper wall 42b of the second member 42 in the side sill 4, and each of the front and rear vertical walls 52c extending in the vertical direction and the upper wall 42b, which extends in the longitudinal direction, in the second member 42 of the side sill 4 continuously and smoothly extend in a corner portion of these in a vehicle side view.

As illustrated in FIG. 1 and FIG. 3, the pillar outer 52 includes two members that are a pillar outer upper 53 located in an upper portion and an intermediate portion and a pillar outer lower 54 located in a lower portion. The pillar outer upper 53 and the pillar outer lower 54 are integrally joined to each other by a known tailor welded blank method or the like in which an end surface at an upper end of the pillar outer lower 54 and an end surface at a lower end of the pillar outer upper 53 abut and are welded to each other.

The boundary portion 52a between the pillar outer upper 53 and the pillar outer lower 54 is located above the upper end of the side sill 4, and is located in or near an upper end portion (a boundary portion between a straight portion and a wide portion in the vehicle side view) of the lower portion, which is widened downward, below the upper portion and the intermediate portion in the vertical direction of the pillar outer 52.

The center pillar 5 is formed such that an upper direct upward portion 53d located above a direct upward portion 54u, which continues from the side sill 4 and is located immediately above the side sill 4, in the vertical direction of the center pillar 5 has the higher rigidity against a load applied to the center pillar 5 in a direction toward the vehicle width inner side than the direct upward portion 54u.

In other words, the direct upward portion 54u is formed to have the relatively lower rigidity against (be crushed more easily by) the load applied to the center pillar 5 in the direction toward the vehicle width inner side than the upper direct upward portion 53d.

In the present example, the pillar outer 52 is formed such that the pillar outer upper 53, which is located at a corresponding height to the upper direct upward portion 53d of the center pillar 5, has a greater plate thickness than the pillar outer lower 54, which is located at a corresponding height to the direct upward portion 54u of the center pillar 5. In this way, the upper direct upward portion 53d is formed to have the higher rigidity against the load toward the vehicle width inner side than the direct upward portion 54u.

Note that as described above, the lower portion of the pillar outer 52 is joined to the second member 42 of the side sill 4, and the pillar outer lower 54 corresponding to the direct upward portion 54u thereby continues from the side sill 4 and is located immediately above the side sill 4.

A configuration of promoting crushing of the direct upward portion 54u at the time when the load toward the vehicle width inner side is applied to the center pillar 5 during the lateral collision is not limited to the configuration as described above in which the pillar outer upper 53 is formed to have the greater plate thickness than the pillar outer lower 54 and the pillar outer lower 54 thereby has the relatively low rigidity, but may be formed by a method as described in JP 2010-173562A.

The pillar inner 51 is formed such that the lower portion thereof is widened in the vehicle longitudinal direction so as to correspond to the lower portion of the pillar outer 52, and is formed with the extending portion 55 that extends to be lower than a position of the upper end of the side sill 4 and the pillar outer 52.

More specifically, as illustrated in FIG. 2 and FIG. 5, in the center pillar arrangement region 4Ra in the vehicle longitudinal direction of the side sill 4, the extending portion 55 is disposed in the closed cross-sectional space 4s in a manner to partition the closed cross-sectional space 4s into spaces on the inner and outer sides in the vehicle width direction. As illustrated in FIG. 2, an upper end 55u of the extending portion 55 is interposed between the upper end flanges 41a, 42a of the first member 41 and the second member 42 in the side sill 4 and is integrally joined to these upper end flanges 41a, 42a. Furthermore, a lower end 55d of the extending portion 55 is interposed between the lower end flanges 41e, 43b of the first member 41 and the third member 43 in the side sill 4 and is integrally joined to these lower end flanges 41e, 43b.

Note that as described above, the lower portion of the pillar inner 51 including the extending portion 55 is formed to be widened in the vehicle longitudinal direction.

Figure 4:
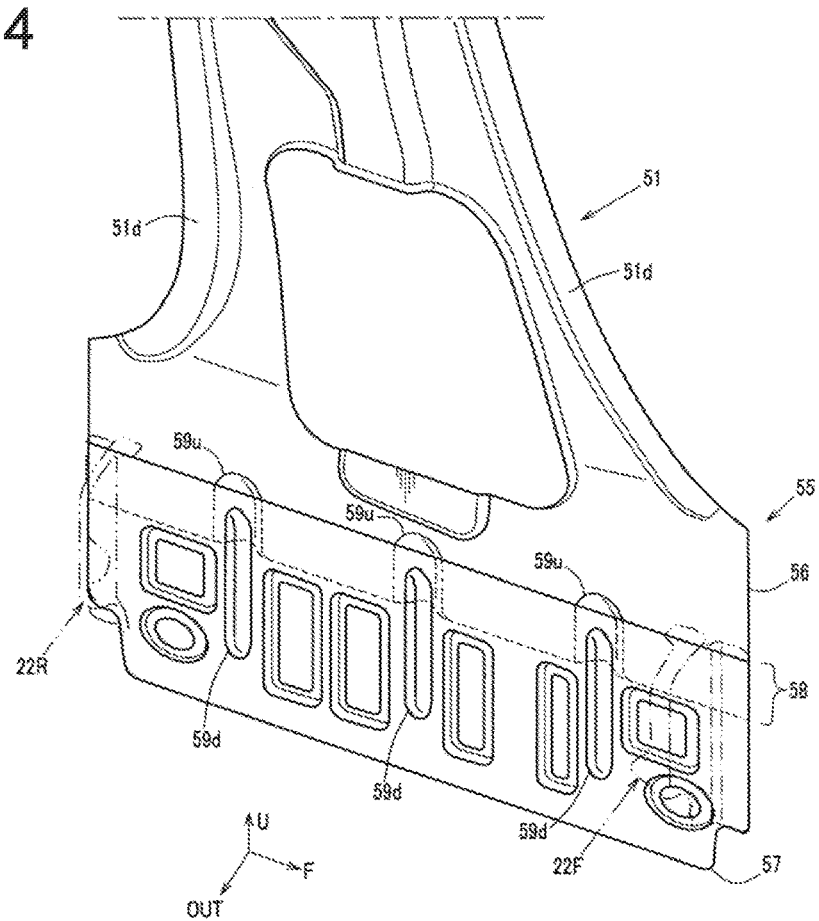
FIG. 4 is a perspective view in which a lower portion of the pillar inner is seen from a vehicle width outer side.

In addition, as illustrated in FIG. 2, FIG. 4, and FIG. 5, the pillar inner 51 has two members that are a pillar inner upper 56 and a pillar inner lower 57 provided below the pillar inner upper 56. A lower portion of the pillar inner upper 56 and an upper portion of the pillar inner lower 57 overlap each other in the vehicle side view (that is, in the vehicle width direction) in the closed cross-sectional space 4s of the side sill 4. That is, an overlapping portion 58 between the lower portion of the pillar inner upper 56 and the upper portion of the pillar inner lower 57 is provided in the above-described extending portion 55, and the lower portion of the pillar inner upper 56 and the upper portion of the pillar inner lower 57 are joined to each other at a plurality of positions along the vehicle longitudinal direction of the extending portion 55 by spot welding or the like (indicated by an "x" in FIG. 2).

As illustrated in FIG. 2, FIG. 4, and FIG. 5, at least in the overlapping portion 58 of the extending portion 55, the lower portion of the pillar inner upper 56 and the upper portion of the pillar inner lower 57 are respectively provided with beads 59u, 59d, each of which extends in the vertical direction and is projected to the vehicle width inner side (that is, recessed when seen from the vehicle width outer side).

In the overlapping portion 58, the beads 59u, 59d in the lower portion of the pillar inner upper 56 and the upper portion of the pillar inner lower 57 are formed at mutually overlapping positions in the vehicle width direction. That is, in the overlapping portion 58, the bead 59d of the pillar inner lower 57 located on the vehicle width outer side is fitted to the bead 59u in the lower portion of the pillar inner upper 56 located on the vehicle width inner side from the vehicle width outer side. In this way, in the vehicle width direction, a recessed vehicle width outer surface of the bead 59u on the pillar inner upper 56 side opposes a projected vehicle width inner surface of the bead 59d on the pillar inner lower 57 side in the vehicle width direction.

In the overlapping portion 58, the beads 59u, 59d in the lower portion of the pillar inner upper 56 and the upper portion of the pillar inner lower 57 are provided at a plurality of positions in a manner to separate from each other in the vehicle longitudinal direction. In the present example, the beads 59u, 59d are provided at three positions in total that are an intermediate position of the extending portion 55 in the vehicle longitudinal direction and positions away therefrom on front and rear sides.

As illustrated in FIG. 5, in the closed cross-sectional space 4s of the side sill 4, the pillar front section 22F and the pillar rear section 22R described above are provided on the vehicle width outer side of the extending portion 55. As illustrated in FIG. 4 and FIG. 5, the pillar front section 22F and the pillar rear section 22R are respectively provided on a front end side of the extending portion 55 and a rear end side of the extending portion 55 in a manner to separate from each other in the vehicle longitudinal direction.

That is, as illustrated in FIG. 5, the outer end flanges 22b, 22b of the pillar front section 22 and the pillar rear section 22R are joined to an inner surface, which faces the closed cross-sectional space 4s, in the outer wall bead 42cc of the outer wall 42c in the side sill 4. Meanwhile, the inner end flanges 22c, 22c of the pillar front section 22 and the pillar rear section 22R are joined to the extending portion 55.

However, as illustrated in FIG. 4 and FIG. 5, the inner end flanges 22c, 22c are at least joined to the overlapping portion 58 in the extending portion 55. As described above, the overlapping portion 58 is arranged such that, of the pillar inner upper 56 and the pillar inner lower 57, the pillar inner lower 57 is located on the vehicle width outer side. In this way, only the pillar inner lower 57 is joined to the inner end flanges 22c, 22c of the pillar front section 22 and the pillar rear section 22R.

The vehicle side body structure according to this embodiment described above is the vehicle side body structure including: a side sill 4 that has the closed cross-sectional space 4s (see FIG. 5) (a closed cross-sectional structure) extending in the vehicle longitudinal direction; and the center pillar 5 that has the closed cross-sectional space 5s (see FIG. 2) (the closed cross-sectional structure) extending upward from the side sill 4, and being formed with the front and rear entry and exit openings 2f, 2r that are openings provided at positions above the side sill 4 and in front of and behind the center pillar 5. As illustrated in FIG. 1 and FIG. 3, the center pillar 5 is configured that the upper direct upward portion 53d located above the direct upward portion 54u, which continues from the side sill 4 and is located immediately above the side sill 4, in the vertical direction of the center pillar 5 has the higher rigidity against the load toward the vehicle width inner side than the direct upward portion 54u. In the closed cross-sectional space 4s of the side sill 4, the pillar front section 22F and the pillar rear section 22R are respectively provided in the front portion and the rear portion of the center pillar arrangement region 4Ra, in which the center pillar 5 is located, in the longitudinal direction.

With the above configuration, it is possible to suppress such twisting of the side sill 4 that the upper portion thereof is displaced toward the vehicle width inner side with respect to the lower portion thereof during the lateral collision while suppressing a weight increase of the side sill 4.

In detail, as described above, in the closed cross-sectional space 4s of the side sill 4, the pillar front section 22F and the pillar rear section 22R are respectively provided in the front portion and the rear portion of the center pillar arrangement region 4Ra. In this way, it is possible to suppress such twisting of the side sill 4 around an axis along the longitudinal direction that the upper portion of the side sill 4 is displaced toward the vehicle width inner side with respect to the lower portion thereof in the center pillar arrangement region 4Ra due to the load toward the vehicle width inner side that is transmitted from the center pillar 5 to the center pillar arrangement region 4Ra of the side sill 4 during the lateral collision.

Thus, compared to the configuration that the entire center pillar arrangement region 4Ra in the longitudinal direction is reinforced to be strong, it is possible to reduce the weight of the side sill 4 while suppressing misshaping of the cross-section of the side sill 4.

Furthermore, in the configuration of adopting a bending deformation mode in which the lower portion of the center pillar 5, where the boundary portion 52a between the direct upward portion 54u and the upper direct upward portion 53d is located, is actively bent and deformed by using a difference in the rigidity between the direct upward portion 54u and the upper direct upward portion 53d so as to suppress an amount of entry of the center pillar 5 to the vehicle width inner side at the time of bending deformation thereof to the vehicle width inner side during the lateral collision, the above-described twisting in the center pillar arrangement region 4Ra of the side sill 4 is suppressed. In this way, it is possible to further reduce the amount of entry of the center pillar 5 to the vehicle width inner side.

In detail, in the boundary portion 52a between the direct upward portion 54u and the upper direct upward portion 53d, the rigidity of which is higher than that of the direct upward portion 54u, in the center pillar 5, the difference in the rigidity is provided between these direct upward portion 54u and upper direct upward portion 53d. In the present example, the pillar outer upper 53, which is located at the corresponding height to the upper direct upward portion 53d of the center pillar 5, is formed to have the greater plate thickness than the pillar outer lower 54, which is located at the corresponding height to the direct upward portion 54u of the center pillar 5. In this way, the direct upward portion 54u is formed to have the relatively lower rigidity than the upper direct upward portion 53d.

As a result, during the lateral collision, the lower portion of the center pillar 5 (that is, the boundary portion 52a and the portion below the boundary portion 52a) is easily and actively crushed. In a lower portion deformation mode (the deformation mode illustrated in FIG. 12 of JP 2010-173562A) that promotes bending of the lower portion of the center pillar 5, it is possible to suppress the amount of entry of the center pillar 5 to the vehicle width inner side when compared to the conventional upper portion deformation mode of the center pillar (the deformation mode illustrated in FIG. 13 of JP 2010-173562A) in which an origin of bending is set at a position above the lower portion.

In FIG. 12 of JP 2010-173562A, a center pillar 5 has such a shape that the origin of bending of the lower portion thereof is projected toward the vehicle width inner side due to the lateral collision, as illustrated by a one-dot chain line.

Meanwhile, the inventors of the present application focused on that the suppression of the above-described twisting of the side sill 4 during the lateral collision suppressed a projected amount of the origin of bending of the lower portion of the center pillar 5 to the vehicle width inner side and, as a result, could contribute to suppression of a projected amount (the amount of entry) of the center pillar 5 to the vehicle width inner side.

Accordingly, in the above-described lower portion deformation mode of the center pillar 5, as in this embodiment, such twisting that the upper portion is displaced toward the vehicle width inner side with respect to the lower portion in the cross-sectional view that is perpendicular to the longitudinal direction of the side sill 4 is suppressed. As a result, it is possible to further suppress the amount of entry of the center pillar 5 to the vehicle width inner side.

Note that in the present example, the pillar front section 22F and the pillar rear section 22R are respectively provided in the front portion and the rear portion of the root portion in the center pillar 5 for the side sill 4. However, the present invention is not limited thereto, and only one of the pillar front section 22F and the pillar rear section 22R in the front portion and the rear portion can be provided. In addition, in the case where one of the sections 22F, 22R is provided in the front portion of the root portion, the provision thereof is not limited to the front end but may be at a position near the front end. In the case where one of the sections 22F, 22R is provided in the rear portion of the root portion, the provision thereof is not limited to the rear end but may be at a position near the rear end.

As an aspect of the present invention, in the center pillar arrangement region 4Ra, the lower portion of the center pillar 5 (the root region joined to the side sill 4) includes the extending portion 55 extending in the closed cross-sectional space 4s (see FIG. 2, FIG. 4, and FIG. 5). In the center pillar arrangement region 4Ra, the lower portion of the center pillar 5 is joined to the side sill outer 4o that is located on the vehicle width outer side of the extending portion 55 (see FIG. 1 and FIG. 5). Both of the pillar front section 22F and the pillar rear section 22R are provided on the vehicle width outer side of the extending portion 55 and are joined to the side sill outer 4o and the extending portion 55 (see FIG. 2, FIG. 3, and FIG. 5).

With the above configuration, even in the case where such a twisting force that the upper portion of the side sill 4 is displaced toward the vehicle width inner side with respect to the lower portion thereof in the cross-sectional view that is perpendicular to the longitudinal direction thereof is applied to the side sill 4 due to the application of the lateral collision load from the lower portion of the center pillar 5 to the side sill outer 4o joined to the lower portion during the lateral collision, the extending portion 55 can receive the twisting force via the pillar front section 22F and the pillar rear section 22R.

Thus, it is possible to suppress misshaping of the cross-section of the side sill 4 caused by the load that is transmitted from the center pillar 5 to the side sill 4 during the lateral collision.

As an aspect of the present invention, as illustrated in FIG. 2, FIG. 3, and FIG. 5 to FIG. 7, the sections are set as the pillar front section 22F and the pillar rear section 22R (first sections), the pillar forward section 21F (a second section) and the pillar rearward section 21R (a second section) are respectively provided in front of and behind the center pillar arrangement region 4Ra in the longitudinal direction of the closed cross-sectional space 4s in the side sill 4, and each of these pillar forward section 21F and the pillar rearward section 21R is provided to have the higher rigidity against misshaping of the cross-section in the cross-sectional view that is perpendicular to the longitudinal direction of the closed cross-sectional space 4s (misshaping of the cross-section of the side sill 4 associated with the load toward the vehicle width inner side that is received by the center pillar 5 and transmitted to the side sill 4) than the pillar front section 22F and the pillar rear section 22R.

With the above configuration, the pillar front section 22F and the pillar rear section 22R are respectively provided in the front portion and the rear portion of the center pillar arrangement region 4Ra in the longitudinal direction of the closed cross-sectional space 4s of the side sill 4, and the pillar forward section 21F and the pillar rearward section 21R are respectively provided in front of and behind the center pillar arrangement region 4Ra. In this way, in cooperation with these sections 21F, 21R, 22F, 22R, it is possible to receive the twisting force, which is applied to the center pillar arrangement region 4Ra of the side sill 4 during the lateral collision, not only by the center pillar arrangement region 4Ra but also by the wide area including regions on the front and rear sides thereof.

As an aspect of the present invention, as illustrated in FIG. 2, FIG. 3, and FIG. 5, the outer wall 42c (a wall portion on the vehicle width outer side) of the side sill 4 has the outer wall bead 42cc (a bead), which is dented toward the side of the closed cross-sectional space 4s, at the position near the center in the vertical direction, and the sections 21F, 21R, 22F, 22R are joined to the outer wall bead 42cc from the side of the closed cross-sectional space 4s.

With the above configuration, the sections 21F, 21R, 22F, 22R are joined to the highly rigid outer wall bead 42cc in the outer wall 42c of the side sill 4 in the vertical direction. In this way, the outer wall 42c can further strongly be pressed against a side of the sections 21F, 21R, 22F, 22R during the lateral collision. Therefore, it is possible to effectively suppress misshaping of the cross-section of the side sill 4 against the twisting force.

As an aspect of the present invention, as illustrated in FIG. 3 and FIG. 7, each of the pillar front section 22F and the pillar rear section 22R has the vertical wall 22a as a section body portion that partitions the closed cross-sectional space 4s in the vehicle longitudinal direction, similarly, each of the pillar forward section 21F and the pillar rearward section 21R has the front wall 23a and the rear wall 23b as section main bodies, and the communicating portion 25H (the clearance portion), which communicates in the vehicle longitudinal direction, is formed in a part of the vertical wall 22a in each of the sections 22F, 22R and parts of the front wall 23a and the rear wall 23b in each of the sections 21F, 21R.

With the above configuration, since the communicating portion 25H is formed in the part of each of the sections 21F, 21R, 22F, 22R, the corrosion inhibitor or the like can easily be sprayed on the inner surface of the side sill 4 from the one side to the other side of each of the sections 21F, 21R, 22F, 22R in the longitudinal direction of the closed cross-sectional space 4s through the communicating portion 25H, and thus, it is possible to improve accuracy and work efficiency of spraying of the corrosion inhibitor or the like on the inner surface of the side sill 4.

The present invention is not limited to the configuration in the above-described embodiment, but can be implemented in various embodiments.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims. Further, if used herein, a phrase of the form "at least one of A and B" means at least one A or at least one B, without being mutually exclusive of each other, and does not require at least one A and at least one B. If used herein, the phrase "and/or" means either or both of two stated possibilities.

DESCRIPTION OF REFERENCE CHARACTERS 2f, 2r: Front or rear entry and exit opening (opening)
4: Side sill
4s: Closed cross-sectional space (closed cross-sectional structure of side sill)
4Ra: Center pillar arrangement region
5: Center pillar
21F: Pillar forward section (section, second section)
21R: Pillar rearward section (section, second section)
22F: Pillar front section (section, first section)
22R: Pillar rear section (section, first section)
22a: Vertical wall (section body portion of first section)
23a: Front wall (section body portion of second section)
23b: Rear wall (section body portion of second section)
25H: Communicating section (configuration that part of section body portion communicates in vehicle longitudinal direction)
42c: Outer wall of side sill outer (inner surface of side sill facing inside of closed cross-section, wall portion on outer side in vehicle width direction of side sill)
42cc: Lateral wall bead (bead)
53d: Upper direct upward portion
54u: Direct upward portion
55: Extending portion

The invention claimed is:

1. A vehicle side body structure, comprising:
a side sill that has a closed cross-sectional structure extending in a vehicle longitudinal direction; and
a center pillar that has a closed cross-sectional structure extending upward from the side sill, and being formed with an opening at a position above the side sill and on each of front and rear sides of the center pillar, wherein
the center pillar is configured such that an upper direct upward portion located above a direct upward portion, which continues from the side sill and is located immediately above the side sill in a vertical direction of the center pillar, has a higher rigidity against a load toward an inner side in a vehicle width direction than the direct upward portion, and
on the inside of a closed cross-section of the side sill, a section is provided in a front portion and/or a rear portion of a center pillar arrangement region, in which the center pillar is located, in a longitudinal direction, wherein
the section is a first section,
a second section is provided in front of and/or behind the center pillar arrangement region in the longitudinal direction of the inside of the closed cross-section, and
the second section is provided to have a higher rigidity against misshaping of a cross-section in a cross-sectional view that is perpendicular to the longitudinal direction of the inside of the closed cross-section than the first section.

2. A vehicle side body structure, comprising:
a side sill that has a closed cross-sectional structure extending in a vehicle longitudinal direction; and a center pillar that has a closed cross-sectional structure extending upward from the side sill, and being formed with an opening at a position above the side sill and on each of front and rear sides of the center pillar, wherein the center pillar is configured such that an upper direct upward portion located above a direct upward portion, which continues from the side sill and is located immediately above the side sill in a vertical direction of the center pillar, has a higher rigidity against a load toward an inner side in a vehicle width direction than the direct upward portion, and on the inside of a closed cross-section of the side sill, a section is provided in a front portion and/or a rear portion of a center pillar arrangement region, in which the center pillar is located, in a longitudinal direction, wherein in the center pillar arrangement region, a root region in the center pillar, which is joined to the side sill, includes an extending portion extending toward the inside of the closed cross-section, in the center pillar arrangement region, the root region of the center pillar is joined on an outer side of the extending portion in the vehicle width direction, the section is provided on the outer side of the extending portion in the vehicle width direction and is joined to an inner surface, which faces the inside of the closed cross-section, in the side sill and the extending portion, the section is a first section, a second section is provided in front of and/or behind the center pillar arrangement region in the longitudinal direction of the inside of the closed cross-section, and the second section is provided to have a higher rigidity against misshaping of a cross-section in a cross-sectional view that is perpendicular to the longitudinal direction of the inside of the closed cross-section than the first section.

3. The vehicle side body structure according to claim 1, wherein
a wall portion on the outer side in the vehicle width direction of the side sill has a bead, which is dented toward the inside of the cross-section, at a position near a center in the vertical direction, and the first section is joined to the bead from the inside of the closed cross-section.

4. The vehicle side body structure according to claim 2, wherein
a wall portion on the outer side in the vehicle width direction of the side sill has a bead, which is dented toward the inside of the cross-section, at a position near a center in the vertical direction, and the first section is joined to the bead from the inside of the closed cross-section.

5. The vehicle side body structure according to claim 1, wherein
the first section has a section body portion that partitions the inside of the closed cross-section in the vehicle longitudinal direction, and
a part of the section body portion of the first section communicates in the vehicle longitudinal direction.

6. The vehicle side body structure according to claim 2, wherein
the first section has a section body portion that partitions the inside of the closed cross-section in the vehicle longitudinal direction, and
a part of the section body portion of the first section communicates in the vehicle longitudinal direction.

7. The vehicle side body structure according to claim 3, wherein
the first section has a section body portion that partitions the inside of the closed cross-section in the vehicle longitudinal direction, and
a part of the section body portion of the first section communicates in the vehicle longitudinal direction.

8. The vehicle side body structure according to claim 4, wherein
the first section has a section body portion that partitions the inside of the closed cross-section in the vehicle longitudinal direction, and
a part of the section body portion of the first section communicates in the vehicle longitudinal direction.

* * * * *